US011948758B2

(12) United States Patent
Fujimoto et al.

(10) Patent No.: US 11,948,758 B2
(45) Date of Patent: Apr. 2, 2024

(54) PUSH SWITCH

(71) Applicant: MITSUMI ELECTRIC CO., LTD., Tama (JP)

(72) Inventors: Daiki Fujimoto, Tama (JP); Hidetake Kikuchi, Tama (JP)

(73) Assignee: MITSUMI ELECTRIC CO., LTD., Tama (JP)

( * ) Notice: Subject to any disclaimer, the term of this patent is extended or adjusted under 35 U.S.C. 154(b) by 0 days.

(21) Appl. No.: 18/155,624

(22) Filed: Jan. 17, 2023

(65) Prior Publication Data

US 2023/0154699 A1 May 18, 2023

Related U.S. Application Data

(63) Continuation of application No. 17/219,612, filed on Mar. 31, 2021, now Pat. No. 11,594,385.

(30) Foreign Application Priority Data

Apr. 28, 2020 (JP) ................................ 2020-078967

(51) Int. Cl.
*H01H 13/48* (2006.01)
*H01H 13/14* (2006.01)
*H01H 13/702* (2006.01)

(52) U.S. Cl.
CPC ............ *H01H 13/48* (2013.01); *H01H 13/14* (2013.01); *H01H 13/702* (2013.01); *H01H 2215/004* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS 6,595,653 B2 7/2003 Saito et al.
6,670,750 B2 * 12/2003 Hanahara ............ H01H 13/702 313/511

(Continued)

FOREIGN PATENT DOCUMENTS

JP H11339593 A 12/1999
JP 2001043772 A 2/2001

(Continued)

*Primary Examiner* — Ahmed M Saeed
(74) *Attorney, Agent, or Firm* — McCoy Russell LLP

(57) ABSTRACT

A push switch contains a circuit substrate, two fixed contacts disposed on the circuit substrate, a dome-shaped spring which is disposed above the two fixed contacts and can be displaced between a first position in which the two fixed contacts are in a non-conductive state and a second position in which the two fixed contacts are in a conductive state and a conductive elastic member disposed on a surface of the dome-shaped spring facing the circuit substrate and having a surface facing the two fixed contacts. At least the surface of the conductive elastic member facing the two fixed contacts has conductivity. When the dome-shaped spring is displaced to the second position, the two fixed contacts are in the conductive state through the conductive elastic member.

8 Claims, 10 Drawing Sheets

(56) References Cited

U.S. PATENT DOCUMENTS

| | | | | |
|---|---|---|---|---|
| 8,686,303 | B2 | 4/2014 | Chen et al. | |
| 10,211,009 | B2 | 2/2019 | Yajima et al. | |
| 2002/0079210 | A1* | 6/2002 | Kawaguchi | H01H 13/702 200/516 |
| 2010/0232861 | A1 | 9/2010 | Shibata et al. | |
| 2017/0140883 | A1* | 5/2017 | Kitamura | H01H 13/10 |
| 2021/0141266 | A1 | 5/2021 | Takimoto et al. | |

FOREIGN PATENT DOCUMENTS

| | | | |
|---|---|---|---|
| JP | 2002203443 | A | 7/2002 |
| JP | 2005019264 | A | 1/2005 |
| WO | 2009123252 | A1 | 10/2009 |
| WO | 2010082420 | A1 | 7/2010 |

* cited by examiner

PUSH SWITCH

CROSS REFERENCE TO RELATED APPLICATION

The present application is a continuation of U.S. Non-Provisional patent application Ser. No. 17/219,612, entitled "PUSH SWITCH," and filed on Mar. 31, 2021. U.S. Non-Provisional patent application Ser. No. 17/219,612 claims priority to Japanese Patent Application No. 2020-78967 filed on Apr. 28, 2020. The entire contents of each of the above-listed applications are hereby incorporated by reference for all purposes.

TECHNICAL FIELD

The present invention generally relates to push switches, in particular to a push switch using a dome-shaped spring.

BACKGROUND

A push switch using a conductive dome-shaped spring has been widely employed as an operation button (for example, a power button, a sound volume control button or the like) for an electronic device such as a smart phone. This push switch is a normally-open type switch which takes an OFF state in a natural state and is shifted from the OFF state to an ON state when a user applies pressing force to the push switch. In this push switch, two fixed contacts are disposed below the dome-shaped spring. The dome-shaped spring is elastically deformed toward the lower side when the pressing force is applied to the push switch. At this time, the dome-shaped spring contacts with the two fixed contacts to provide a conductive path between the two fixed contacts and thus the push switch is shifted from the OFF state to the ON state.

Since this kind of push switch can provide the user with a good click feeling due to elastic deformation of the dome-shaped spring, this kind of push switch has been typically employed as a switch for each key of a keyboard or a touch pad of a notebook computer. However, this kind of push switch has a problem that the dome-shaped spring contacts with the fixed contacts and contact noise is caused by the contact between the dome-shaped spring contact and the fixed contacts when the push switch is shifted from the OFF state to the ON state. Thus, when this kind of push switch is used as the switch for each key of the keyboard or the touch pad of the notebook computer, the contact noise gives an uncomfortable feeling to the user or a person around the user.

In order to reduce the contact noise caused by the contact between the dome-shaped spring and the fixed contacts in this kind of push switch, there has been proposed a technique of providing a conductive elastic member between the dome-shaped spring and the fixed contacts (see patent documents 1 and 2). For example, the patent document 1 discloses a push switch 500 shown in FIG. 1. The push switch 500 includes a circuit substrate 510, two fixed contacts 520 disposed on the circuit substrate 510, a dome-shaped spring 530 disposed above the fixed contacts 520 and an anisotropic conductive member 540 which has elasticity and is disposed on the fixed contacts 520.

For example, the anisotropic conductive member 540 is an anisotropic conductive member obtained by dispersing and arranging a plurality of conductive wires in an insulating elastic material layer such as rubber so that a lengthwise direction of the conductive wires coincides with a thickness direction of the insulating elastic material layer, an anisotropic conductive sheet obtained by dispersing and arranging conductive particles in the insulating elastic material layer so as to provide a plurality of conductive paths through the insulating elastic material layer in the thickness direction of the insulating elastic material, an anisotropic conductive sheet obtained by dispersing the conductive particles in the insulating elastic material or the like. The anisotropic conductive member 540 can provide a conductive path in the thickness direction thereof as well as provide insulating property in a plane direction.

When pressing force is applied to the push switch 500, the dome-shaped spring 530 is elastically deformed toward the lower side and the dome-shaped spring 530 contacts with the anisotropic conductive member 540. Since the anisotropic conductive member 540 provides the conductive path in the thickness direction thereof as described above, the dome-shaped spring 530 electrically contacts with the two fixed contacts 520 through the conductive path. As a result, the two fixed contacts 520 are electrically connected to each other through the dome-shaped spring 530 and the anisotropic conductive member 540. Further, at this time, since the anisotropic conductive member 540 absorbs impact caused by the contact between the dome-shaped spring 530 and the fixed contacts 520, the contact noise caused by the contact between the dome-shaped spring 530 and the fixed contacts 520 is reduced. As described above, by providing the anisotropic conductive member 540 having the elasticity on the fixed contacts 520, it is possible to reduce the contact noise caused by the contact between the dome-shaped spring 530 and the fixed contacts 520.

However, the anisotropic conductive member 540 has a high contact resistance value (e.g., 3 to 10Ω) because the anisotropic conductive member 540 utilizes the conductive members (the conductive wires or the conductive particles) dispersed in the insulating elastic material to provide the conductive path in the thickness direction thereof. Thus, if the anisotropic conductive member 540 is provided on the two fixed contacts 520 as disclosed in the patent document 1, there is a problem that an electrical resistance of an electrical connection between the two fixed contacts 520 increases due to the contact resistance value of the anisotropic conductive member 540. Further, it is necessary to use an adhesive agent having conductivity for adhering the anisotropic conductive member 540 on the two fixed contacts 520 and electrically connecting the anisotropic conductive member 540 and the two fixed contacts 520. Thus, there is another problem that this adhesive agent also increases the electrical resistance of the electrical connection between the two fixed contacts 520. Furthermore, the anisotropic conductive member 540 is high cost because the anisotropic conductive member 540 has a complicated structure in which the conductive wires or the conductive particles are dispersed in the insulating elastic material as described above. By using such a high-cost anisotropic conductive member 540, there is yet another problem that a manufacturing cost of the push switch 500 increases.

Further, the patent document 2 discloses a push switch 600 shown in FIG. 2. The push switch 600 includes a circuit substrate 610, two fixed contacts 620 disposed on the circuit substrate 610, a dome-shaped spring 630 disposed above the fixed contacts 620 and a conductive elastic member 640 disposed on a lower surface of the dome-shaped spring 630. The conductive elastic member 640 includes an insulating elastic material such as a resin material or rubber and a conductivity imparting agent such as carbon powder dispersed in the insulating elastic material. The conductive elastic member 640 has elasticity and conductivity. When pressing force is applied to the push switch 600, the dome-shaped spring 630 is elastically deformed toward the lower side. As a result, the conductive elastic member 640 disposed on the lower surface of the dome-shaped spring 630 contacts with the two fixed contacts 620. At this time, the conductive elastic member 640 provides a conductive path between the two fixed contacts 620 and the two fixed contacts 620 are electrically connected through the conductive elastic member 640, and thereby the push switch 600 is shifted to an ON state. Since the conductive elastic member 640 has the elasticity, impact of the contact between the conductive elastic member 640 and the two fixed contacts 620 is absorbed and thus it is possible to reduce the contact noise when the push switch 600 is shifted to the ON state.

However, even in the push switch 600 disclosed in the patent document 2, the conductive elastic member 640 has a high contact resistance value (e.g., 3 to 10Ω) because the conductive elastic member 640 utilizes the conductivity imparting agent dispersed in the insulating elastic material to provide the conductive path. Thus, there is a problem that an electrical resistance of an electrical connection between the two fixed contacts 620 provided through the conductive elastic member 640 increases. Further, since it is necessary to uniformly disperse the conductivity imparting agent such as the carbon powder in the insulating elastic material for obtaining the conductive elastic member 640, the conductive elastic member 640 is high cost. By using such a high-cost conductive elastic member 640, there is another problem that a manufacturing cost of the push switch 600 increases.

RELATED ART DOCUMENT

Patent Documents

JP 2001-43772A
JP H11-339593A

SUMMARY OF THE INVENTION

Problems to be Solved by the Invention

The present invention has been made in view of the above-described problems of the conventional art. Accordingly, it is an object of the present invention to provide a push switch which can reduce a contact noise when the push switch is shifted to an ON state and suppress increase of an electrical resistance of an electrical connection between two fixed contacts.

Means for Solving the Problems

The above object is achieved by the present inventions defined in the following (1) to (12).

(1) A push switch comprising:

a circuit substrate;

two fixed contacts disposed on the circuit substrate;

a dome-shaped spring which is disposed above the two fixed contacts and can be displaced between a first position in which the two fixed contacts are in a non-conductive state and a second position in which the two fixed contacts are in a conductive state; and a conductive elastic member disposed on a surface of the dome-shaped spring facing the circuit substrate and having a surface facing the two fixed contacts, wherein at least the surface of the conductive elastic member facing the two fixed contacts has conductivity, and wherein when the dome-shaped spring is displaced to the second position, the two fixed contacts are in the conductive state through the conductive elastic member.

(2) The push switch according to the above (1), wherein the conductive elastic member includes an elastic portion and a conductive layer disposed on the elastic portion so as to face the two fixed contacts, and wherein the conductive layer of the conductive elastic member contacts with the two fixed contacts when the dome-shaped spring is displaced to the second position and thereby the two fixed contacts are in the conductive state through the conductive layer of the conductive elastic member.

(3) The push switch according to the above (2), wherein the conductive elastic member is a linear member or film-like member configured so that the conductive layer of the conductive elastic member contacts with the two fixed contacts when the dome-shaped spring is displaced to the second position.

(4) The push switch according to the above (2) or (3), wherein the conductive layer of the conductive elastic member is disposed so as to cover an entire surface of the elastic portion of the conductive elastic member.

(5) The push switch according to any one of the above (1) to (4), further comprising a spacer disposed on the circuit substrate, wherein the dome-shaped spring is placed on the spacer.

(6) The push switch according to the above (5), wherein the spacer includes a base portion located on the circuit substrate and an opening for exposing the two fixed contacts toward the conductive elastic member.

(7) The push switch according to the above (6), wherein the spacer further includes a cutout portion for releasing air under the dome-shaped spring when the dome-shaped spring is displaced from the first position to the second position.

(8) The push switch according to any one of the above (1) to (7), further comprising a cover film covering the dome-shaped spring from an upper side.

(9) A push switch comprising:

a circuit substrate;

a central contact disposed on the circuit substrate;

an outer contact disposed on the circuit substrate so as to be spaced apart from the central contact;

a dome-shaped spring which is disposed above the central contact and the outer contact and can be displaced between a first position in which the central contact and the outer contact are in a non-conductive state and a second position in which the central contact and the outer contact are in a conductive state; and a conductive elastic member disposed on a surface of the dome-shaped spring facing the circuit substrate and having a surface facing the central contact, wherein at least the surface of the conductive elastic member facing the central contact has conductivity, and wherein when the dome-shaped spring is displaced to the second position, the central contact and the outer contact are in the conductive state through the dome-shaped spring and the conductive elastic member.

(10) The push switch according to the above (9), wherein the conductive elastic member includes an elastic portion and a conductive layer disposed so as to cover the elastic portion, and wherein the conductive layer of the conductive elastic member contacts with the central contact when the dome-shaped spring is displaced to the second position and thereby the central contact and the outer contact are in the conductive state through the conductive layer of the conductive elastic member.

(11) The push switch according to the above (10), wherein the dome-shaped spring has:

a marginal portion which electrically contacts with the outer contact when the dome-shaped spring is in both of the first position and the second position, and a central movable portion which does not electrically contact with the central contact when the dome-shaped spring is in the first position and electrically contacts with the central contact through the conductive layer of the conductive elastic member when the dome-shaped spring is in the second position.

(12) The push switch according to the above (11), further comprising a conductive spacer disposed on the circuit substrate, wherein the marginal portion of the dome-shaped spring electrically contacts with the outer contact through the spacer when the dome-shaped spring is in both the first position and the second position.

Effects of the Invention

In the push switch of the present invention, the conductive elastic member whose surface facing the fixed contacts has the conductivity is disposed on the surface of the dome-shaped spring facing the circuit substrate. Therefore, it is possible to absorb impact caused by contact between the conductive elastic member and the fixed contacts with the conductive elastic member and thus it is possible to reduce a contact noise when the push switch is shifted to an ON state. Further, an electrical connection between the two fixed contacts is provided through the conductive elastic member. Therefore, it is possible to suppress an increase of an electrical resistance of the electrical connection between the two fixed contacts as compared with a conventional push switch in which the electrical connection between the two fixed contacts is provided through a conductive member provided in an insulating elastic material.

DETAILED DESCRIPTION

Figure 1:
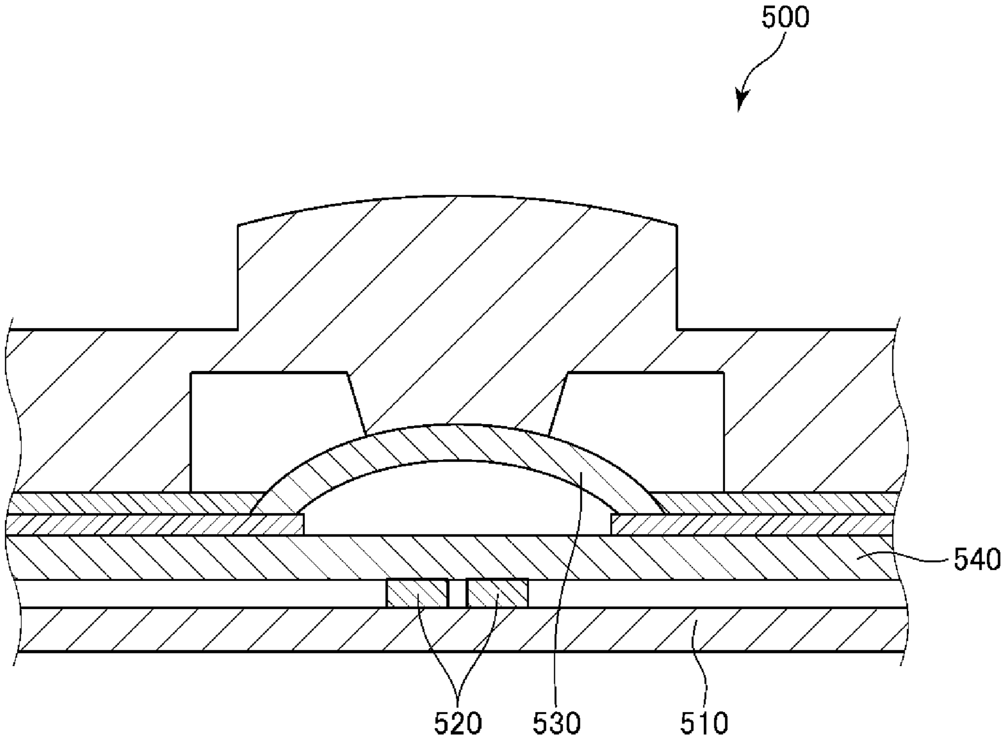
Prior art Fig. 1
FIG. 1 is a cross-sectional view schematically showing a conventional push switch.
Figure 2:
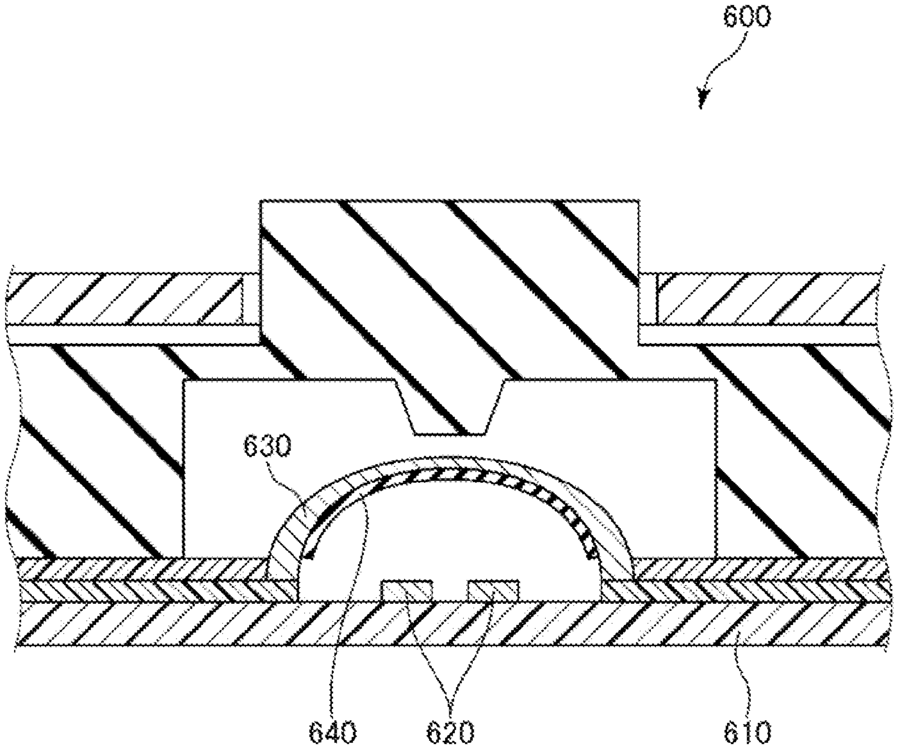
Prior art Fig. 2
FIG. 2 is a cross-sectional view schematically showing another conventional push switch.

Hereinafter, a push switch of the present invention will be described based on preferred embodiments shown in the accompanying drawings. Note that each of the drawings referred in the following description is a schematic diagram prepared for explaining the present invention. A dimension (such as a length, a width and a thickness) of each component shown in the drawings is not necessarily identical to an actual dimension. Further, the same reference numbers are used throughout the drawings to refer to the same or like elements. Hereinafter, a positive direction of the Z-axis in each figure is referred to as "an upper side", a negative direction of the Z-axis in each figure is referred to as "a lower side", a positive direction of the Y-axis in each figure is referred to as "a near side", a negative direction of the Y-axis in each figure is referred to as "a far side", a positive direction of the X-axis in each figure is referred to as "a right side" and a negative direction of the X-axis in each figure is referred to as "a left side".

First Embodiment

Figure 3:
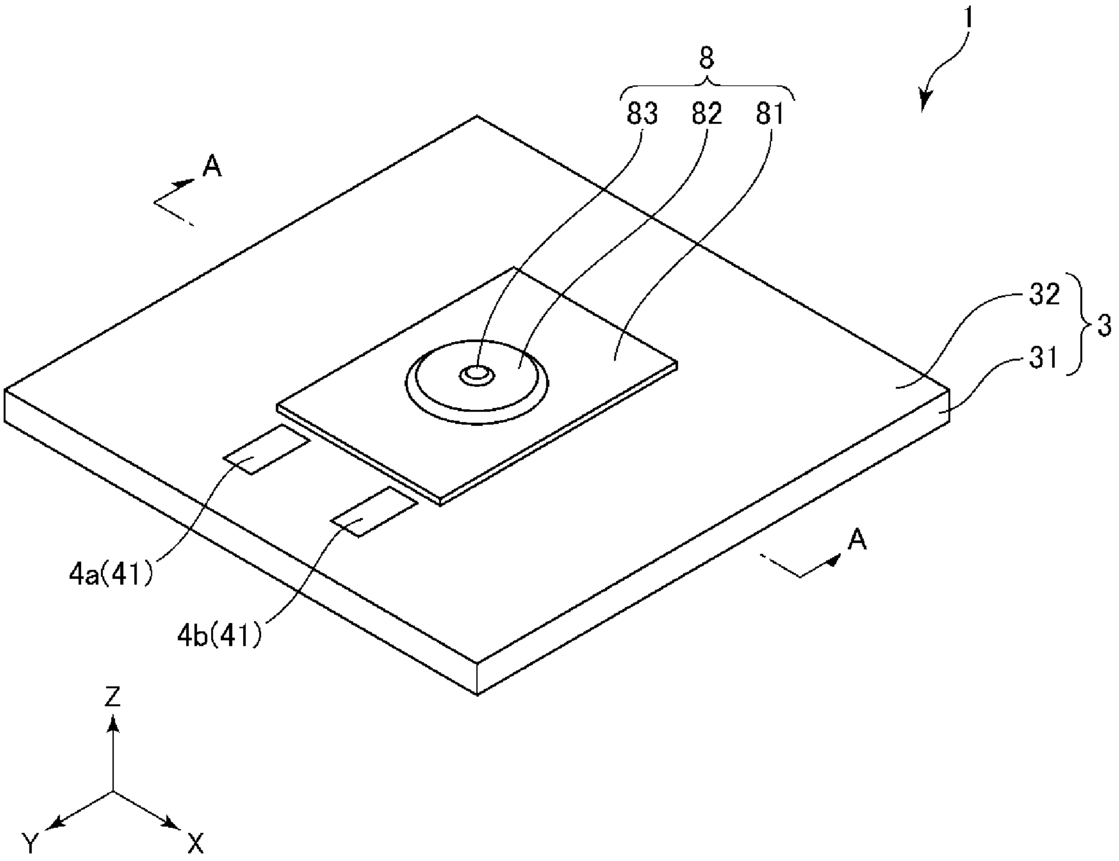
FIG. 3 is a perspective view of a push switch according to a first embodiment of the present invention.
Figure 4:
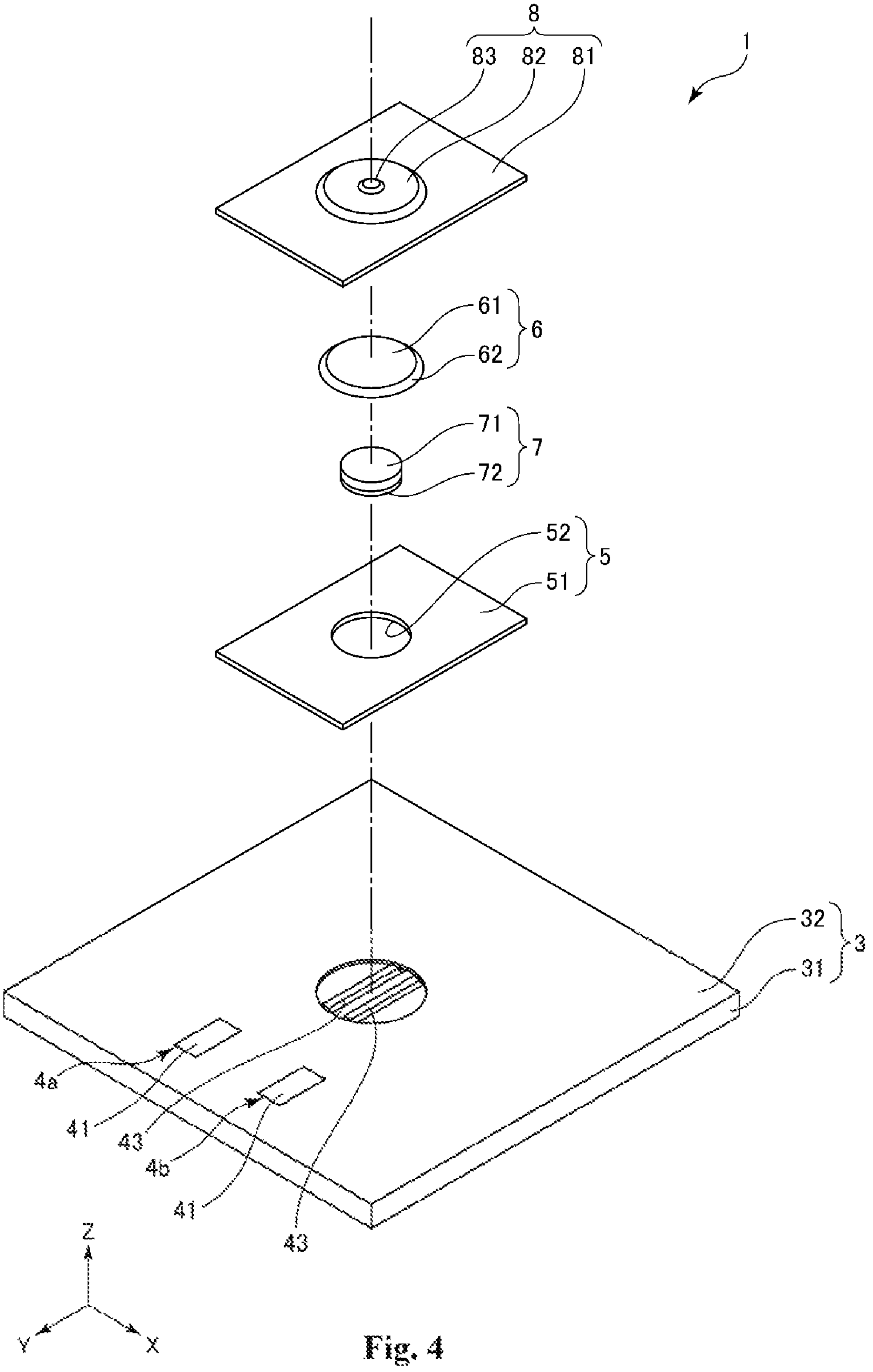
FIG. 4 is an exploded perspective view of the push switch shown in FIG. 3.
Figure 5:
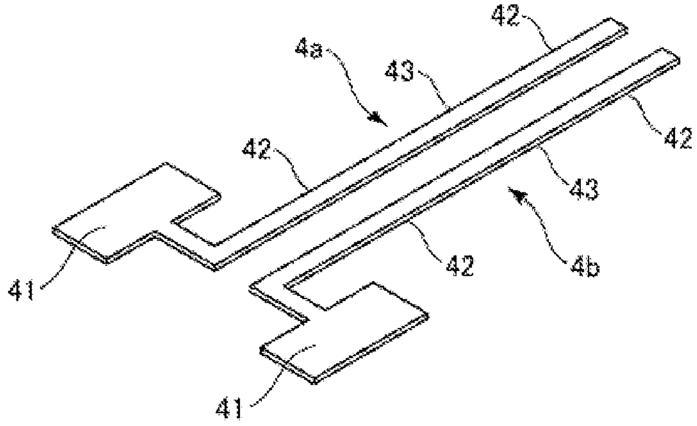
FIG. 5 is a perspective view of two fixed contacts of the push switch shown in FIG. 3.
Figure 6:
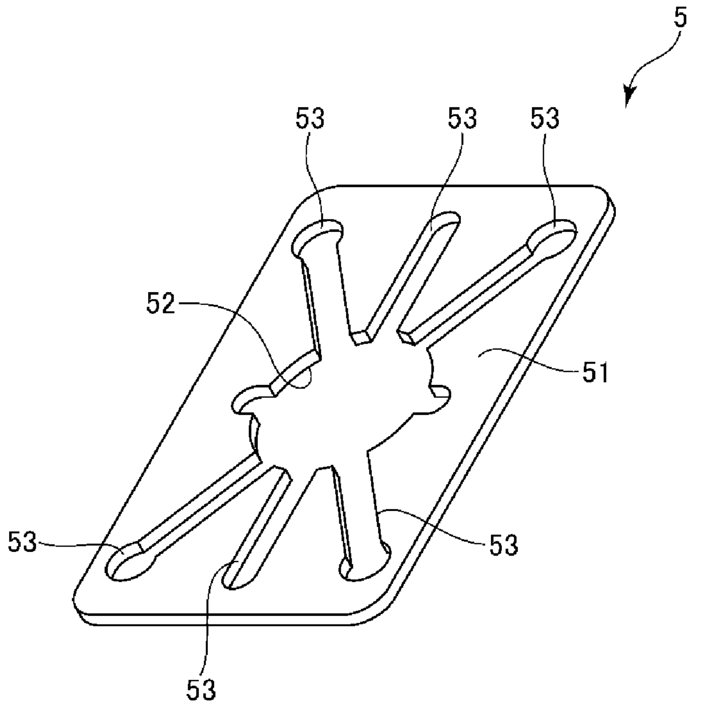
FIG. 6 is a perspective view showing another example of a spacer.
Figure 7:
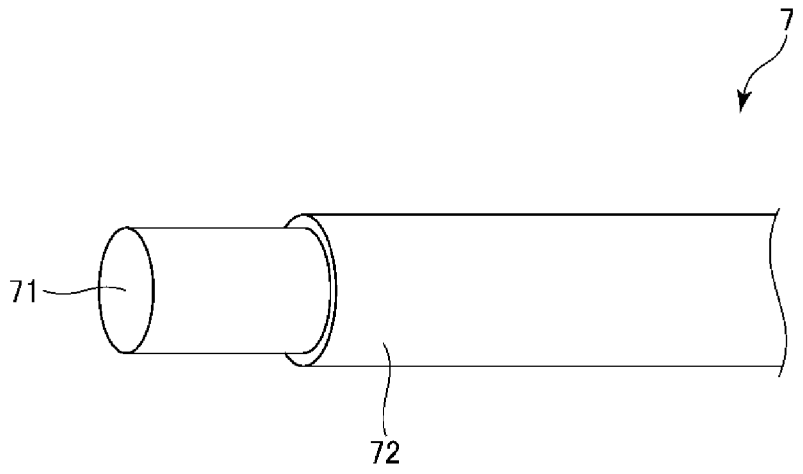
FIG. 7 is a perspective view showing another example of a conductive elastic member.
Figure 8:
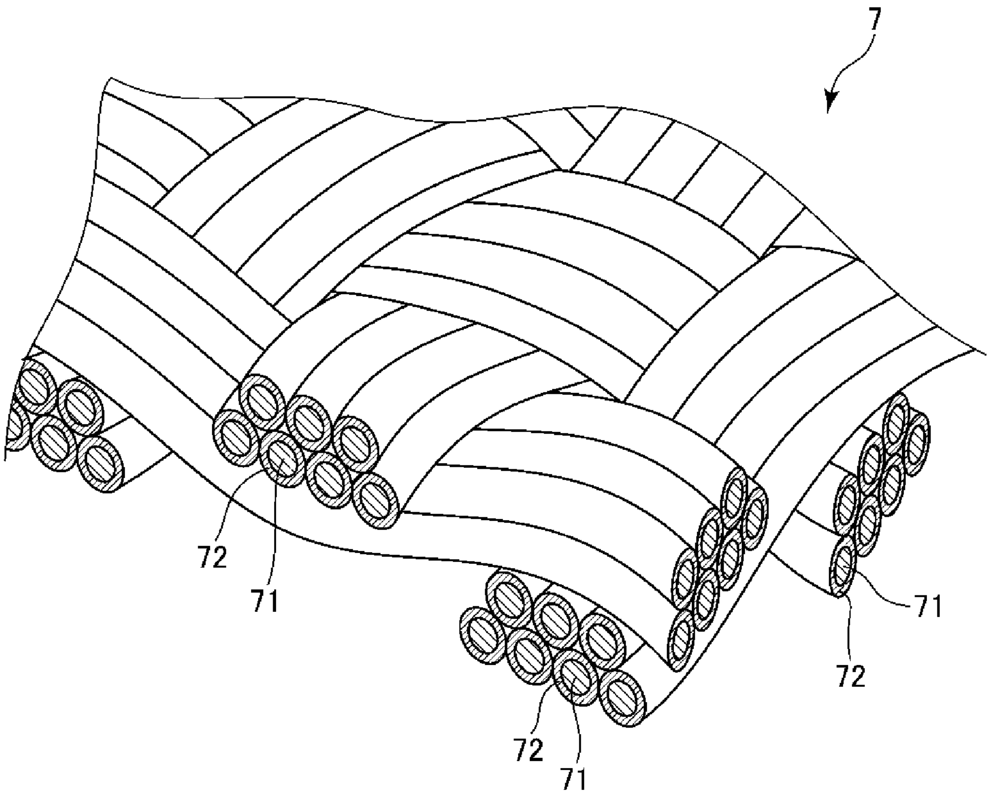
FIG. 8 is a perspective view showing yet another example of the conductive elastic member.
Figure 9:
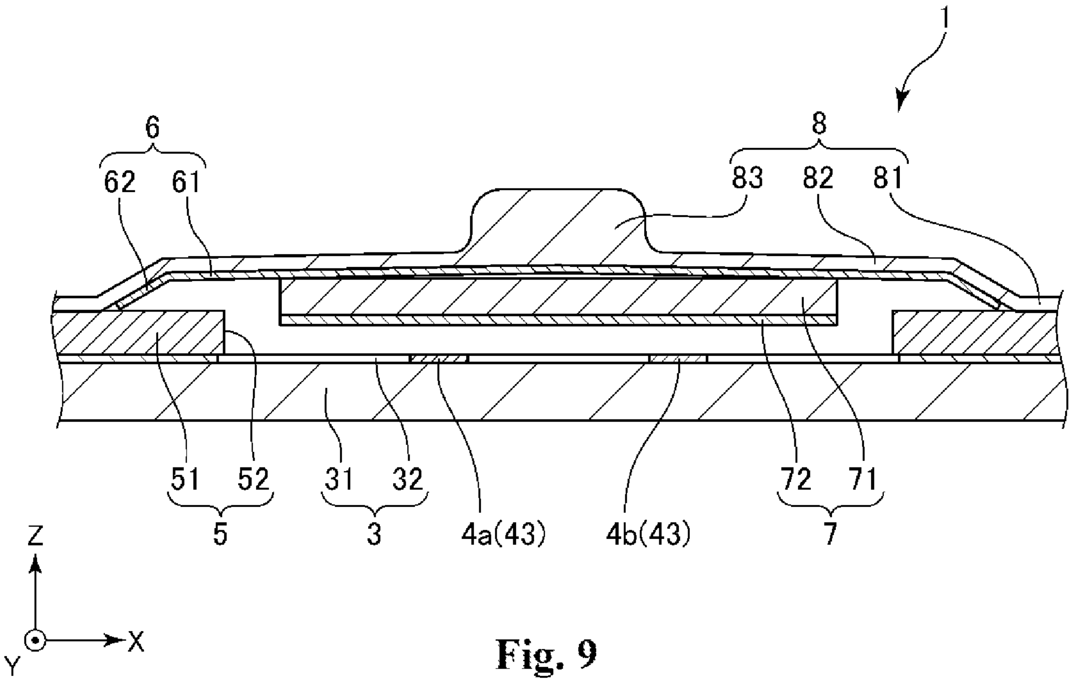
FIG. 9 is a cross-sectional view of the push switch taken along an A-A line when the push switch shown in FIG. 3 is in a natural state.
Figure 10:
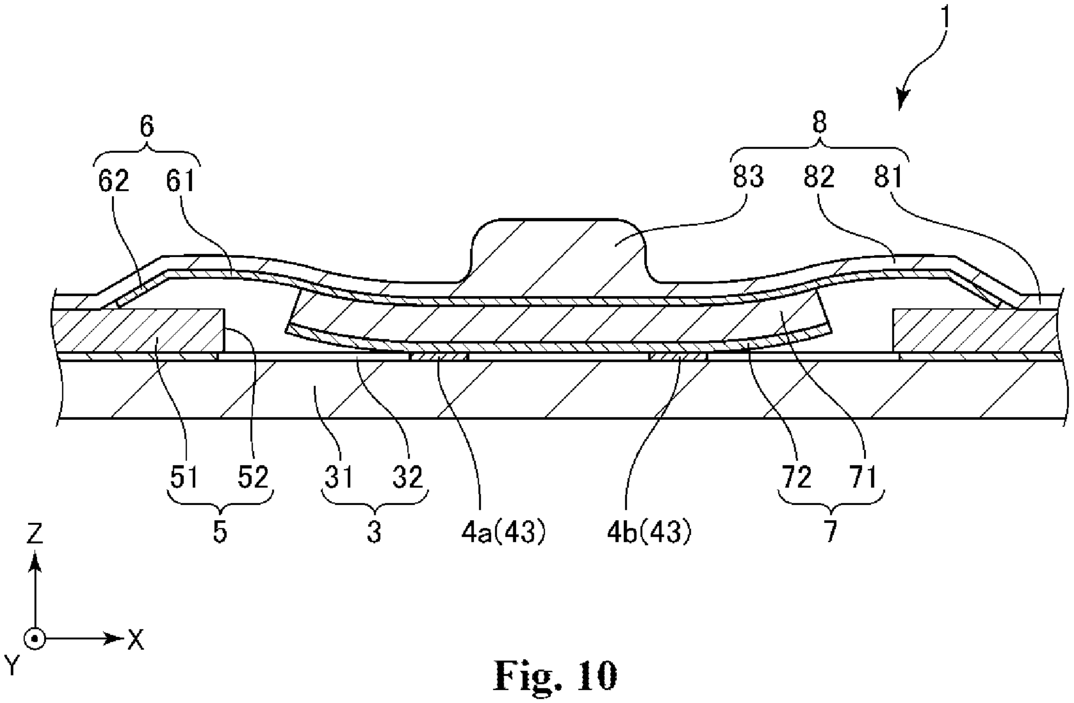
FIG. 10 is a sectional view of the push switch taken along the A-A line when pressing force is applied to the push switch shown in FIG. 3.
Figure 11A:
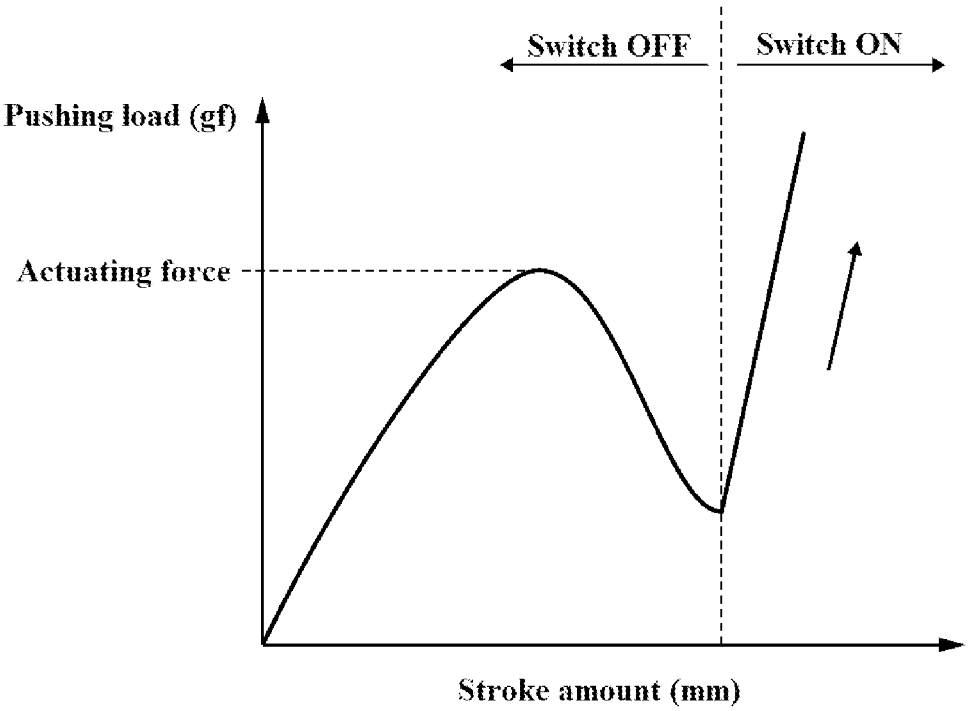
FIG. 11A shows a feeling curve (load characteristic) of the push switch shown in FIG. 3 in a case that the conductive elastic member is not disposed on a surface of a central movable portion of a dome-shaped spring facing a circuit substrate.
Figure 11B:
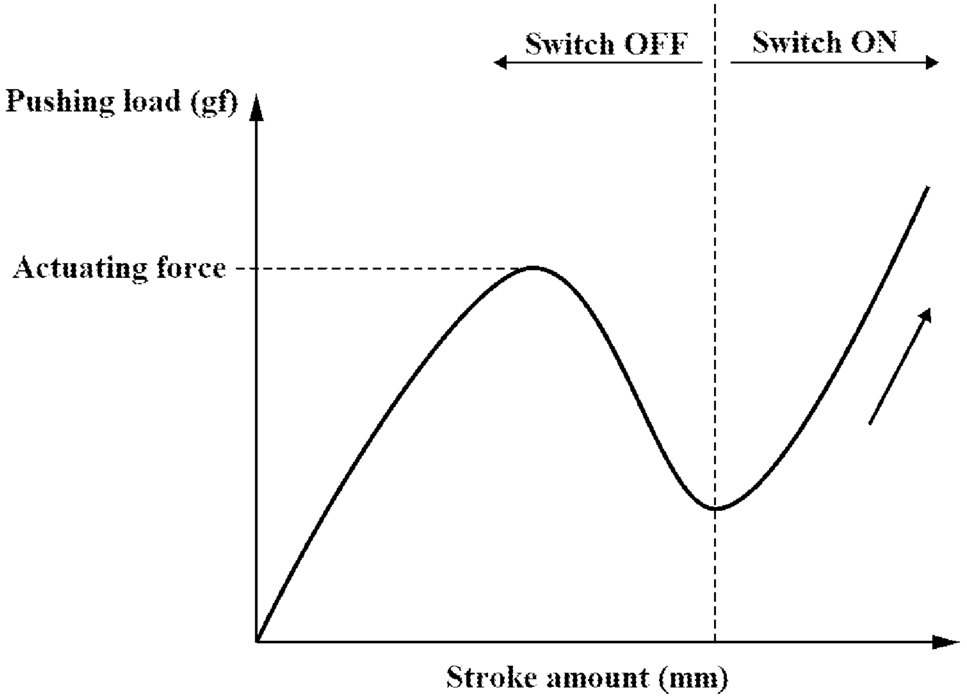
FIG. 11B shows the feeling curve (load characteristic) of the push switch shown in FIG. 3 in which the conductive elastic member is disposed on the surface of the central movable portion of the dome-shaped spring facing the circuit substrate.

First, a push switch according to a first embodiment of the present invention will be described in detail with reference to FIGS. 3 to 11B. FIG. 3 is a perspective view of the push switch according to the first embodiment of the present invention. FIG. 4 is an exploded perspective view of the push switch shown in FIG. 3. FIG. 5 is a perspective view of two fixed contacts of the push switch shown in FIG. 3. FIG. 6 is a perspective view showing another example of a spacer. FIG. 7 is a perspective view showing another example of a conductive elastic member. FIG. 8 is a perspective view showing yet another example of the conductive elastic member. FIG. 9 is a cross-sectional view of the push switch taken along an A-A line when the push switch shown in FIG. 3 is in a natural state. FIG. 10 is a sectional view of the push switch taken along the A-A line when pressing force is applied to the push switch shown in FIG. 3. FIG. 11A shows a feeling curve (load characteristic) of the push switch shown in FIG. 3 in a case that the conductive elastic member is not disposed on a surface of a central movable portion of a dome-shaped spring facing a circuit substrate. FIG. 11B shows the feeling curve (load characteristic) of the push switch shown in FIG. 3 in which the conductive elastic member is disposed on the surface of the central movable portion of the dome-shaped spring facing the circuit substrate.

A push switch 1 shown in FIG. 3 is a switch which is shifted to an ON state when pressing force exceeding actuating force of the push switch 1 is applied from a user thereto and shifted to an OFF state when the pressing force applied from the user thereto is released. As shown in FIG. 3, the push switch 1 is a low-profile sheet-like device. The push switch 1 is typically used as a push switch for a touchpad of a notebook computer.

As shown in FIG. 4, the push switch 1 includes a circuit substrate 3, a first fixed contact 4*a* and a second fixed contact 4*b* (two fixed contacts) disposed on the circuit substrate 3, a spacer 5 disposed on the circuit substrate 3, a dome-shaped spring 6 which is placed on the spacer 5 so as to be located above the first fixed contact 4*a* and the second fixed contact 4*b* and which can be displaced between a first position in which the first fixed contact 4*a* and the second fixed contact 4*b* are in a non-conductive state and a second position in which the first fixed contact 4*a* and the second fixed contact 4*b* are in a conductive state, a conductive elastic member 7 disposed on a surface (lower surface) of the dome-shaped spring 6 facing the circuit substrate 3 and including an elastic portion 71 and a conductive layer 72 disposed on the elastic portion 71 so as to face the first fixed contact 4*a* and the second fixed contact 4*b* and a cover film 8 covering the dome-shaped spring 6 from the upper side.

The circuit substrate 3 serves as a base of the push switch 1 as well as a circuit substrate for mounting the first fixed contact 4*a* and the second fixed contact 4*b* thereon. As the circuit substrate 3, it is possible to use a rigid substrate formed in a thin plate shape with glass, epoxy resin or the like and a flexible substrate formed in a thin plate shape with polyimide, PET or the like. The circuit substrate 3 includes a base portion 31 on which the first fixed contact 4*a* and the second fixed contact 4*b* are formed and an insulating layer 32 provided so as to cover an upper side of the base portion 31.

In the illustrated aspect, the first fixed contact 4*a* and the second fixed contact 4*b* are disposed on the base portion 31 and only a terminal portion 41 and a contact portion 43 (see FIG. 5) of each of the first fixed contact 4*a* and the second fixed contact 4*b* are exposed toward the upper side.

Each of the first fixed contact 4*a* and the second fixed contact 4*b* is a conductive portion formed on the base portion 31 of the circuit substrate 3. In the present embodiment, the first fixed contact 4*a* and the second fixed contact 4*b* are fixedly disposed on the base portion 31 of the circuit substrate 3 so as to be spaced apart from each other. Further, the insulating layer 32 exists between the first fixed contact 4*a* and the second fixed contact 4*b* and thus the first fixed contact 4*a* and the second fixed contact 4*b* are insulated from each other. The first fixed contact 4*a* and the second fixed contact 4*b* can be obtained by performing a patterning step or a printing step with respect to the base portion 31 of the circuit substrate 3 with a plating process using a conductive resin or a highly conductive metallic material such as an aluminum alloy, copper and aluminum bronze having high conductivity. When the first fixed contact 4*a* and the second fixed contact are in the non-conductive state, the push switch 1 takes the OFF state. When the first fixed contact 4*a* and the second fixed contact are in the conductive state through the conductive layer 72 of the conductive elastic member 7, the push switch 1 takes the ON state.

As shown in FIG. 5, each of the first fixed contact 4*a* and the second fixed contact 4*b* includes the terminal portion 41 to be connected to another device, an extending portion 42 extending from the terminal portion 41 and the contact portion 43 positioned in the middle of the extending portion 42 and to be contacted with the conductive layer 72 of the conductive elastic member 7 when the push switch 1 is shifted to the ON state.

As shown in FIG. 4, in a state that the push switch 1 is assembled, the terminal portions 41 and the contact portions 43 of the first fixed contact 4*a* and the second fixed contact 4*b* are exposed toward the upper side. On the other hand, the extending portions 42 of the first fixed contact 4*a* and the second fixed contact 4*b* are covered by the insulating layer 32 of the circuit substrate 3 and thus are not exposed toward the outside. In this regard, since the extending portions 42 of the first fixed contact 4*a* and the second fixed contact 4*b* are covered by the insulating layer 32 of the circuit substrate 3, only portions of the insulating layer 32 which are located on the extending portions 42 of the first fixed contact 4*a* and the second fixed contact 4*b* are raised by a thickness of the extending portions 42 of the first fixed contact 4*a* and the second fixed contact 4*b* as compared with other portions.

As shown in FIG. 3, the terminal portions 41 of the first fixed contact 4*a* and the second fixed contact 4*b* are exposed from the insulating layer 32 of the circuit substrate 3 toward the upper side in an area which is not covered by the cover film 8. In the state that the push switch 1 is assembled as shown in FIG. 3, it is possible to connect the push switch 1 to another device by respectively connecting the terminal portions 41 of the first fixed contact 4*a* and the second fixed contact 4*b* to corresponding terminals of the other device. On the other hand, as shown in FIG. 4, the contact portions 43 of the first fixed contact 4*a* and the second fixed contact 4*b* are exposed toward the upper side so as to face the conductive layer 72 of the conductive elastic member 7 in the state that the push switch 1 is assembled.

The spacer 5 is a film-like member disposed on the circuit substrate 3. The spacer 5 can be formed from a resin material such as naphthalene and PET, a metallic material or the like. As shown in FIG. 9, since the dome-shaped spring 6 is placed on the spacer 5, it is possible to adjust a height of position of the dome-shaped spring 6 with respect to the first fixed contact 4*a* and the second fixed contact 4*b* formed on the base portion 31 of the circuit substrate 3 by adjusting a thickness of the spacer 5. By adjusting the height of the position of the dome-shaped spring 6 with respect to the first fixed contact 4*a* and the second fixed contact 4*b*, it is possible to adjust a timing until the conductive layer 72 of the conductive elastic member 7 disposed on the surface (the lower surface) of the dome-shaped spring 6 facing the circuit substrate 3 contacts with the first fixed contact 4*a* and the second fixed contact 4*b* when the pressing force is applied to the push switch 1. Namely, it is possible to adjust a stroke amount of the dome-shaped spring 6 for allowing the push switch 1 to be in the ON state. Therefore, even if the conductive elastic member 7 is disposed on the surface of the dome-shaped spring 6 facing the circuit substrate 3 like the push switch 1 of the present embodiment, it is possible to prevent the stroke amount of the dome-shaped spring 6 for allowing the push switch 1 to be in the ON state from significantly decreasing. Thus, it is possible to provide a good click feeling to the user.

The spacer 5 is located on the insulating layer 32 of the circuit substrate 3 and includes a base portion 51 which is fixed on the insulating layer 32 of the circuit substrate 3 and an opening 52 for exposing the first fixed contact 4*a* and the second fixed contact 4*b* formed on the circuit substrate 3 with respect to the conductive layer 72 of the conductive elastic member 7. The base portion 51 of the spacer 5 is fixed on the insulating layer 32 of the circuit substrate 3 by any fixing means such as an adhesive agent and a screw. As shown in FIG. 9, in the state that the push switch 1 is assembled, the first fixed contact 4*a* and the second fixed contact 4*b* are located within the opening 52 of the spacer 5. Although the opening 52 has a circular shape in the illustrated aspect, a shape of the opening 52 is not particularly limited as long as it can allow the first fixed contact 4*a* and the second fixed contact 4*b* to be exposed to the conductive layer 72 of the conductive elastic member 7.

Further, FIG. 6 shows another example of the spacer 5. In the other example of the spacer 5 shown in FIG. 6, the spacer 5 further includes a plurality of cutout portions 53 for releasing air located under the dome-shaped spring 6 when the pressing force is applied to the push switch 1 and the dome-shaped spring 6 is elastically deformed toward the lower side and displaced from the first position to the second position. Each of the cutout portions 53 radially extends from the opening 52. By forming the plurality of cutout portions 53 in the spacer 5, it is possible to secure a space for moving the air located under the dome-shaped spring 6 when the dome-shaped spring 6 is elastically deformed toward the lower side and displaced from the first position to the second position. Thus, the air located under the dome-shaped spring 6 can move into the space when the dome-shaped spring 6 is displaced from the first position to the second position. Therefore, it is possible to reduce influence of the air located under the dome-shaped spring 6 with respect to the pressing operation of the push switch 1, that is, the elastic deformation of the dome-shaped spring 6 toward the lower side and thus it is possible to stabilize the click feeling of the push switch 1. The push switch 1 using the other example of the spacer 5 as shown in FIG. 6 is also involved within the scope of the present invention. The shape of each of the cutout portions 53 shown in FIG. 6 is merely an example and the shape of each of the cutout portions 53 can be appropriately modified.

Referring back to FIG. 4, the dome-shaped spring 6 is an elastic member having an upwardly convex dome-shape. The dome-shaped spring 6 is configured to be displaced between the first position in which the first fixed contact 4*a* and the second fixed contact 4*b* are in the non-conductive state and the second position in which the first fixed contact 4*a* and the second fixed contact 4*b* are in the conductive state. In the present embodiment, since the electrical connection between the first fixed contact 4*a* and the second fixed contact 4*b* is achieved through the conductive layer 72 of the conductive elastic member 7 and the dome-shaped spring 6 itself is not contained in the conductive path between the first fixed contact 4*a* and the second fixed contact 4*b*. Thus, the dome-shaped spring 6 may be formed from a conductive material such as a metallic material or an insulating material such as a resin material. However, since it is possible to easily realize a high spring constant and high restoring force, the dome-shaped spring 6 is preferably formed from the metallic material. In this case, it is possible to obtain the dome-shaped spring 6 by molding a metal sheet into a dome shape with a drawing press method.

As shown in FIG. 9, the dome-shaped spring 6 is placed on the spacer 5 so as to be located above the first fixed contact 4*a* and the second fixed contact 4*b*. The dome-shaped spring 6 has a central movable portion 61 which can be elastically deformed toward the first fixed contact 4*a* and the second fixed contact 4*b* located below the dome-shaped spring 6 and a marginal portion 62 which serves as a leg portion of the dome-shaped spring 6 and contacts with the spacer 5. The central movable portion 61 is formed at a substantially center of the dome-shaped spring 6 in its planar view and the marginal portion 62 is formed so as to surround the central movable portion 61.

The dome-shaped spring 6 is placed on the base portion 51 of the spacer 5 so that the central movable portion 61 faces the first fixed contact 4*a* and the second fixed contact 4*b* located within the opening 52 of the spacer 5 through a gap. Namely, in a natural state that the pressing force is not applied to the push switch 1 from the user, the dome-shaped spring 6 is convex upward. In the natural state shown in FIG. 9, when the pressing force exceeding the actuating force of the push switch 1 is applied to the push switch 1, the central movable portion 61 of the dome-shaped spring 6 is elastically deformed toward the lower side and the dome-shaped spring 6 is displaced from the first position to the second position as shown in FIG. 10.

Referring back to FIG. 4, the conductive elastic member 7 is a substantially disc-shaped member disposed on a surface (lower surface) of the central movable portion 61 of the dome-shaped spring 6 facing the circuit substrate 3. The conductive elastic member 7 includes the elastic portion 71 and the conductive layer 72 disposed on the elastic portion 71 so as to face the first fixed contact 4*a* and the second fixed contact 4*b*. Since the conductive layer 72 has conductivity and faces the first fixed contact 4*a* and the second fixed contact 4*b*, at least a surface of the conductive elastic member 7 facing the first fixed contact 4*a* and the second fixed contact 4*b* has the conductivity.

The conductive elastic member 7 has a function of absorbing impact caused when the conductive layer 72 contacts with the first fixed contact 4*a* and the second fixed contact 4*b* to reduce the contact noise when the push switch 1 is shifted to the ON state as well as a function of providing the conductive path between the first fixed contact 4*a* and the second fixed contact 4*b* when the dome-shaped spring 6 is displaced to the second position.

The conductive elastic member 7 is fixed on the surface of the central movable portion 61 of the dome-shaped spring 6 facing the circuit substrate 3 with an adhesive agent. As described above, since the dome-shaped spring 6 is not contained in the conduction path between the first fixed contact 4*a* and the second fixed contact 4*b* in the present embodiment, it is not necessary to electrically connect the dome-shaped spring 6 and the conductive elastic member 7. Therefore, it is not necessary to use a conductive adhesive agent in order to fix the conductive elastic member 7 on the surface of the central movable portion 61 of the dome-shaped spring 6 facing the circuit substrate 3. Thus, it is possible to fix the conductive elastic member 7 on the surface of the central movable portion 61 of the dome-shaped spring 6 facing the circuit substrate 3 with a non-conductive adhesive agent. Since the conductive adhesive agent is high cost compared with the non-conductive adhesive agent, it is possible to reduce a manufacturing cost of the push switch 1 by using the non-conductive adhesive agent.

The elastic portion 71 is formed from an arbitrary elastic material such as an elastic resin material and rubber. The elastic portion 71 serves as a cushion for absorbing the impact caused when the conductive layer 72 contacts with the first fixed contact 4*a* and the second fixed contact 4*b* to reduce the contact noise when the push switch 1 is shifted to the ON state. The conductive layer 72 is a layer portion formed from a conductive material such as a metallic material and formed on the elastic portion 71 so as to face the first fixed contact 4*a* and the second fixed contact 4*b*. The conductive layer 72 provides the conductive path between the first fixed contact 4*a* and the second fixed contact 4*b* when the dome-shaped spring 6 is displaced to the second position. As shown in FIGS. 9 and 10, although the conductive layer 72 is disposed on only the surface (the lower surface) of the elastic portion 71 facing the first fixed contact 4*a* and the second fixed contact 4*b* in the illustrated aspect, the present invention is not limited thereto. For example, the scope of the present invention involves an aspect in which the conductive layer 72 is formed so as to cover an entire surface of the elastic portion 71.

In the natural state shown in FIG. 9, the dome-shaped spring 6 is in the first position. When the dome-shaped spring 6 is in the first position, the conductive layer 72 of the conductive elastic member 7 does not contact with the first fixed contact 4*a* and the second fixed contact 4*b*. Thus, when the dome-shaped spring 6 is in the first position, the first fixed contact 4*a* and the second fixed contact 4*b* are in the non-conductive state.

On the other hand, when the pressing force exceeding the actuating force of the push switch 1 is applied to the push switch 1 in the natural state shown in FIG. 9, the central movable portion 61 of the dome-shaped spring 6 is elastically deformed toward the lower side and the dome-shaped spring 6 is displaced from the first position to the second position as shown in FIG. 10. When the dome-shaped spring 6 is in the second position, the conductive layer 72 of the conductive elastic member 7 contacts with the first fixed contact 4*a* and the second fixed contact 4*b*. Thus, when the dome-shaped spring 6 is in the second position, the conductive layer 72 of the conductive elastic member 7 serves as the conductive path between the first fixed contact 4*a* and the second fixed contact 4*b* and thereby the first fixed contact 4*a* and the second fixed contact 4*b* are in the conductive state. Further, when the conductive layer 72 of the conductive elastic member 7 contacts with the first fixed contact 4*a* and the second fixed contact 4*b*, the elastic portion 71 absorbs the impact caused when the conductive layer 72 contacts with the first fixed contact 4*a* and the second fixed contact 4*b* to reduce the contact noise when the push switch 1 is shifted to the ON state.

As described above, since the elastic portion 71 can reduce the contact noise when the push switch 1 is shifted to the ON state in the push switch 1 of the present embodiment, it is possible to realize high quietness. Furthermore, the conductive layer 72 of the conductive elastic member 7 provides the conductive path between the first fixed contact 4*a* and the second fixed contact 4*b* in the push switch 1 of the present embodiment. Since the conductive layer 72 is the layer having the conductivity and disposed on the surface of the elastic portion 71, the conductive layer 72 has a very low contact resistance substantially equal to an electrical resistance of the conductive material forming the conductive layer 72. As a result, it is possible to significantly suppress an increase of the electrical resistance of the electrical connection between the first fixed contact 4*a* and the second fixed contact 4*b* compared with the prior art in which a conductive path between two fixed contacts is provided by conductive members (conductive wires, conductive particles, a conductive imparting agent, etc.) dispersed in an insulating elastic material.

Although the conductive layer 72 has only one layer in the illustrated aspect, the conductive layer 72 may have a multilayer structure. For example, the conductive layer 72 may have a multilayer structure composed of a first layer formed from copper on the surface of the elastic portion 71 and a second layer formed from nickel on the first layer. By forming the conductive layer 72 so as to have the multilayer structure composed of a plurality of conductive materials, it is possible to adjust characteristics of the conductive layer 72 such as electrical resistance, corrosion resistance, adhesion to the elastic portion 71 and the like.

A thickness of the elastic portion 71 is appropriately set according to a required cushioning performance. Similarly, a thickness of the conductive layer 72 is appropriately set according to a required performance such as required conductivity of the conductive layer 72. For example, a total thickness of the conductive elastic member 7 obtained by summing the thickness of the elastic portion 71 and the thickness of the conductive layer 72 is preferably in the range of about 0.03 to 0.3 mm. If the thickness of the conductive elastic member 7 is less than the lower limit value, there is a case that it is not possible to sufficiently provide the cushioning performance of the elastic portion 71 and the conductivity of the conductive layer 72. If the thickness of the conductive elastic member 7 exceeds the upper limit value, there is a case that it is not possible to sufficiently secure the stroke amount for allowing the dome-shaped spring 6 to be displaced from the first position and the click feeling of the push switch 1 is deteriorated.

Although the conductive elastic member 7 has a disc shape as a whole in the illustrated aspect, the present invention is not limited thereto as long as the conductive layer 72 is disposed on at least the surface of the elastic portion 71 facing the first fixed contact 4*a* and the second fixed contact 4*b*. The conductive elastic member 7 may have any shape such as a linear shape or a film-like shape.

For example, FIG. 7 shows the conductive elastic member 7 having the linear shape. In the example shown in FIG. 7, the conductive elastic member 7 includes the elastic portion 71 having the linear shape and formed from an elastic material such as PET and the conductive layer 72 formed so as to cover the entire surface of the elastic portion 71. In this example, the elastic portion 71 serves as a core portion of the conductive elastic member 7 and the conductive layer 72 covers the entire surface of the conductive elastic member 7. Further, the conductive elastic member 7 is a fiber-like member. In this case, the conductive elastic member 7 is disposed on the surface of the central movable portion 61 of the dome-shaped spring 6 facing the circuit substrate 3 with a length and a position for allowing the conductive elastic member 7 to contact with the first fixed contact 4*a* and the second fixed contact 4*b* when the dome-shaped spring 6 is displaced to the second position.

A plurality of linear conductive elastic members 7 shown in FIG. 7 may be used simultaneously. FIG. 8 shows an example of a film-like member formed from the plurality of conductive elastic members 7 shown in FIG. 7. The film-like member shown in FIG. 8 is formed by weaving the plurality of conductive elastic members 7 having the fiber-like shape shown in FIG. 7. The film-like member can be used as the conductive elastic member 7. In this case, the film-like member is disposed on the surface of the central movable portion 61 of the dome-shaped spring 6 facing the circuit substrate 3 with a size and a position for allowing the film-like member to contact with the first fixed contact 4*a* and the second fixed contact 4*b* when the dome-shaped spring 6 is displaced to the second position. These aspects are also involved within the scope of the present invention.

Referring back to FIG. 4, the cover film 8 covers the dome-shaped spring 6 from the upper side. The cover film 8 is used for sealing and fixing the contact portions 43 of the first fixed contact 4*a* and the second fixed contact 4*b*, the spacer 5, the dome-shaped spring 6 and the conductive elastic member 7 on the circuit substrate 3. The cover film 8 includes a film-like base portion 81, a receiving portion 82 formed at a substantially center of the base portion 81 and having a shape corresponding to the shape of the dome-shaped spring 6 and a pressing portion 83 disposed at a position corresponding to the central movable portion 61 of the dome-shaped spring 6. Although the cover film 8 includes the pressing portion 83 in the illustrated aspect, the present invention is not limited thereto. An aspect in which the cover film 8 does not include the pressing portion 83 is also involved within the scope of the present invention.

The base portion 81 is formed from a flexible resin material such as nylon. The base portion 81 adheres onto the base portion 51 of the spacer 5 to seal the contact portions 43 of the first fixed contact 4*a* and the second fixed contact 4*b*, the spacer 5, the dome-shaped spring 6 and the conductive elastic member 7. The adhesion of the cover film 8 with respect to the base portion 51 of the spacer 5 is not performed by point adhesions but is performed so as to surround an outer edge of the base portion 51 of the spacer 5. As a result, it is possible to realize dust-proofing of the push switch 1. In addition, since the cover film 8 presses the dome-shaped spring 6 onto the spacer 5 from the upper side, it is possible to prevent the dome-shaped spring 6 from swinging on the spacer 5. A method of adhering the base portion 81 onto the base portion 51 of the spacer 5 is not particularly limited. For example, the base portion 81 can adhere onto the base portion 51 of the spacer 5 with a laser welding method, a thermal welding method, a double-sided tape or an adhesive agent.

The receiving portion 82 is a concave portion formed at the position corresponding to the dome-shaped spring 6 and opened toward the lower side. The receiving portion 82 is configured to contain the dome-shaped spring 6 therein. As shown in FIG. 9, in the state that the push switch 1 is assembled, the dome-shaped spring 6 is contained in the receiving portion 82. The dome-shaped spring 6 is fixed in the receiving portion 82 with arbitrary fixing means such as an adhesive agent. When the central movable portion 61 of the dome-shaped spring 6 is elastically deformed, the cover film 8 is also elastically deformed together with the central movable portion 61 of the dome-shaped spring 6.

The pressing portion 83 is formed on an upper surface of the receiving portion 82 at a position corresponding to the central movable portion 61 of the dome-shaped spring 6 so as to protrude from the upper surface of the receiving portion 82 toward the upper side. The pressing portion 83 is used for efficiently transmitting the pressing force applied from the user to the push switch 1 to the dome-shaped spring 6 to elastically deform the central movable portion 61 of the dome-shaped spring 6 toward the lower side. The pressing portion 83 may be provided integrally with the base portion 81 and the receiving portion 82 or may be formed as a separate member and fixed on the upper surface of the receiving portion 82 by a heat welding method or the like. Although the pressing portion 83 has a projection shape protruding from the upper surface of the receiving portion 82 toward the upper side in the illustrated aspect, the present invention is not limited thereto. The pressing portion 83 may have a planar shape.

When the user applies the pressing force to the push switch 1 to push down the pressing portion 83 of the cover film 8, the central movable portion 61 of the dome-shaped spring 6 is elastically deformed toward the lower side and the push switch 1 is shifted from the OFF state to the ON state. On the other hand, when the user releases the pressing force applied to the push switch 1 through the pressing portion 83 of the cover film 8, the central movable portion 61 of the dome-shaped spring 6 is elastically restored toward the upper side and the push switch 1 is shifted from the ON state to the OFF state.

Next, the operation of the push switch 1 will be described in detail with reference to FIGS. 9 and 10. FIG. 9 shows a cross-sectional view of the push switch 1 taken along an A-A line in the natural state in which the pressing force is not applied to the push switch 1. FIG. 10 shows a cross-sectional view of the push switch 1 taken along the A-A line in a pressed state in which the pressing force exceeding the actuating force of the push switch 1 is applied to the push switch 1.

As shown in FIG. 9, the dome-shaped spring 6 is convex upward in the natural state of the push switch 1. Namely, the dome-shaped spring 6 is in the first position in the natural state. In the first position, the conductive layer 72 of the conductive elastic member 7 disposed on the surface of the central movable portion 61 of the dome-shaped spring 6 facing the circuit substrate 3 does not contact with the first fixed contact 4*a* and the second fixed contact 4*b*. Thus, when the dome-shaped spring 6 is in the first position, the first fixed contact 4*a* and the second fixed contact 4*b* are in the non-conductive state. Therefore, the push switch 1 takes the OFF state in the natural state shown in FIG. 9.

When the pressing force exceeding the actuating force of the push switch 1 is applied to the push switch 1 through the pressing portion 83 of the cover film 8 in the natural state shown in FIG. 9, the central movable portion 61 of the dome-shaped spring 6 is elastically deformed toward the lower side and the dome-shaped spring 6 is displaced from the first position to the second position. At this time, the push switch 1 is shifted to the pressed state shown in FIG. 10. In the pressed state shown in FIG. 10, the dome-shaped spring 6 is in the second position. In the second position, the conductive layer 72 of the conductive elastic member 7 disposed on the surface of the central movable portion 61 of the dome-shaped spring 6 facing the circuit substrate 3 contacts with the first fixed contact 4*a* and the second fixed contact 4*b*. Thus, when the dome-shaped spring 6 is in the second position, the conductive layer 72 of the conductive elastic member 7 provides the conductive path between the first fixed contact 4*a* and the second fixed contact 4*b*. In this state, the first fixed contact 4*a* and the second fixed contact 4*b* are in the conductive state through the conductive layer 72 of the conductive elastic member 7. Thus, the push switch 1 takes the ON state in the state shown in FIG. 10.

When the pressing force from the user is released in the pressed state shown in FIG. 10, the push switch 1 is restored to the natural state shown in FIG. 9 by restoring force of the push switch 1 provided by elastic restoring force of the dome-shaped spring 6 and the cover film 8.

Next, the quietness of the push switch 1 realized by the conductive elastic member 7 will be described in detail with reference to FIGS. 11A and 111B. FIG. 11A shows a feeling curve (load characteristic) of the push switch 1 in a case that the conductive elastic member 7 is not disposed on the surface of the central movable portion 61 of the dome-shaped spring 6 facing the circuit substrate 3. FIG. 11B shows the feeling curve (the load characteristic) of the push switch 1 of the present embodiment in which the conductive elastic member 7 is disposed on the surface of the central movable portion 61 of the dome-shaped spring 6 facing the circuit substrate 3. The vertical axis of the graphs in FIG. 11A and FIG. 11B is a pushing load (pressing force) (gf)

applied to the push switch 1 and the horizontal axis of the graphs in FIG. 11A and FIG. 11B is the stroke amount (mm) of the dome-shaped spring 6.

As shown in FIGS. 11A and 111B, the load required to press down the dome-shaped spring 6 gradually increases until the load applied to the push switch 1 reaches the actuating force of the push switch 1. Thereafter, when the load applied to the push switch 1 reaches the actuating force of the push switch 1, the shape of the dome-shaped spring 6 is inverted so that the central movable portion 61 of the dome-shaped spring 6 is convex downward and thus the load decreases. Thus, when the load applied to the push switch 1 reaches the actuating force of the push switch 1, the dome-shaped spring 6 is rapidly pushed down to provide the click feeling to the user and the push switch 1 is shifted to the ON state.

After that, when the dome-shaped spring 6 is rapidly pushed down, the central movable portion 61 of the dome-shaped spring 6 contacts with the first fixed contact 4*a* and the second fixed contact 4*b* in the case of FIG. 11A and the load rapidly increases. This rapid increase of the load indicates that the central movable portion 61 of the dome-shaped spring 6 directly contacts with rigid bodies (the first fixed contact 4*a* and the second fixed contact 4*b*).

On the other hand, in the case of FIG. 11B, when the dome-shaped spring 6 is rapidly pushed down, the conductive layer 72 of the conductive elastic member 7 disposed on the surface of the central movable portion 61 of the dome-shaped spring 6 facing the circuit substrate 3 contacts with the first fixed contact 4*a* and the second fixed contact 4*b* and the load increases. However, since the elastic portion 71 of the conductive elastic member 7 serves as the cushion in the case of FIG. 11B, the increase of the load becomes gentle as compared with the case of FIG. 11A. This indicates that the elastic portion 71 of the conductive elastic member 7 is elastically deformed when the conductive layer 72 of the conductive elastic member 7 contacts with the first fixed contact 4*a* and the second fixed contact 4*b* to absorb the impact caused when the conductive layer 72 of the conductive elastic member 7 contacts with the first fixed contact 4*a* and the second fixed contact 4*b*. Therefore, in the push switch 1 of the present embodiment shown in FIG. 11B, it is possible to reduce the contact noise when the push switch 1 is shifted to the ON state as compared with the case of FIG. 11A.

As described above, in the push switch 1 of the present embodiment, the contact noise when the push switch 1 is shifted to the ON state is reduced by the elastic portion 71 of the conductive elastic member 7. Further, the conductive layer 72 of the conductive elastic member 7 has the very low contact resistance substantially equal to the electrical resistance of the conductive material forming the conductive layer 72. Therefore, in the push switch 1 of the present embodiment, it is possible to significantly suppress the increase of the electrical resistance of the electrical connection between the first fixed contact 4*a* and the second fixed contact 4*b* as compared with the prior art in which the conductive path between the two fixed contacts is provided by the conductive members (conductive lines, conductive particles and a conductive imparting agent) dispersed in the insulating elastic material. Furthermore, since the conductive adhesive agent is not contained in the conductive path between the first fixed contact 4*a* and the second fixed contact 4*b* in the push switch 1 of the present embodiment, it is possible to further suppress the increase of the electrical resistance of the electrical connection between the first fixed contact 4*a* and the second fixed contact 4*b* as compared with the prior art in which the conductive adhesive is contained in the conductive path between the two fixed contacts.

Second Embodiment

Figure 12:
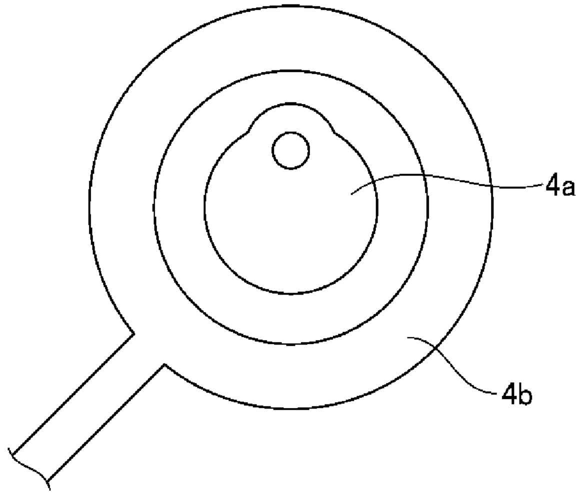
FIG. 12 is a diagram showing two fixed contacts used in a push switch according to a second embodiment of the present invention.
Figure 13:
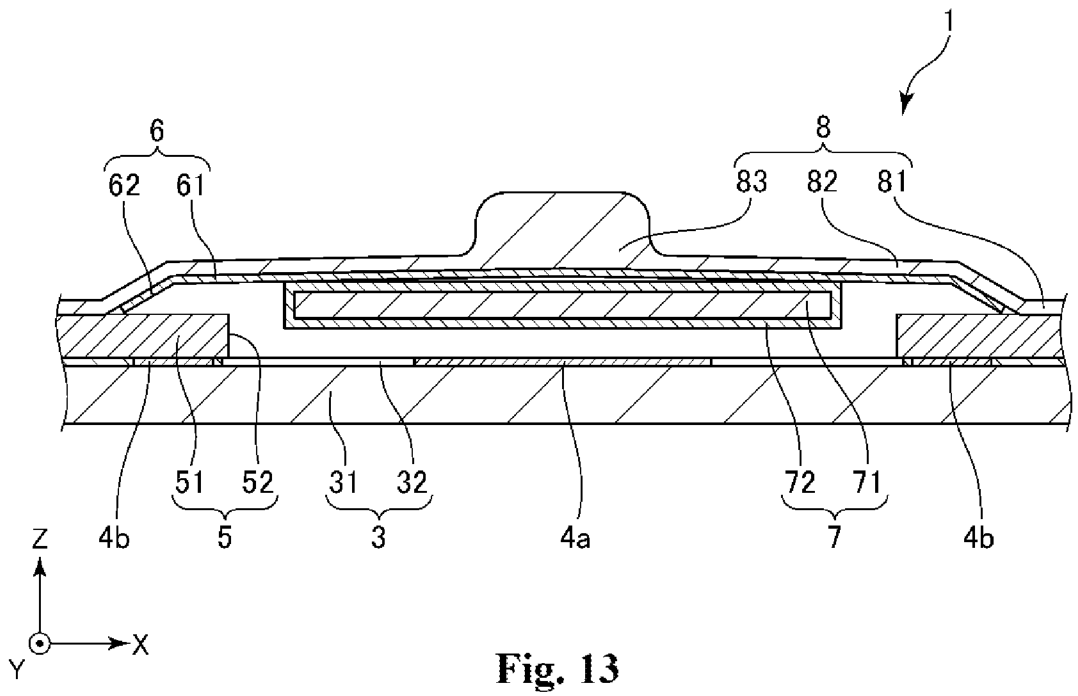
FIG. 13 is a vertical cross-sectional view of the push switch according to the second embodiment of the present invention when the push switch is in the natural state.
Figure 14:
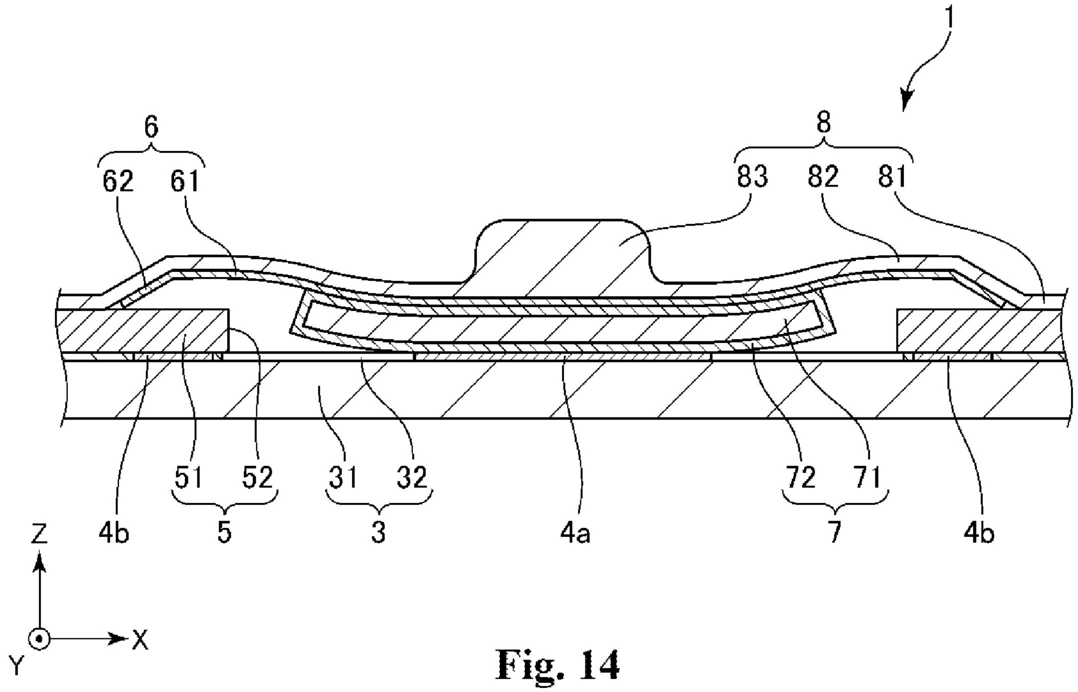
FIG. 14 is a vertical sectional view of the push switch according to the second embodiment of the present invention when the pressing force is applied to the push switch.

Next, description will be given to a push switch 1 according to a second embodiment of the present invention with reference to FIGS. 12 to 14. FIG. 12 is a diagram showing two fixed contacts used in the push switch according to the second embodiment of the present invention. FIG. 13 is a vertical cross-sectional view of the push switch according to the second embodiment of the present invention when the push switch is in the natural state. FIG. 14 is a vertical cross-sectional view of the push switch according to the second embodiment of the present invention when the pressing force is applied to the push switch.

Hereinafter, the push switch 1 of the second embodiment will be described by placing emphasis on the points differing from the push switch 1 of the first embodiment with the same matters being omitted from the description. The push switch 1 of the present embodiment has the same configuration as the configuration of the push switch 1 of the first embodiment except that the constituent material of the dome-shaped spring 6 is limited to the conductive material, the configurations of the first fixed contact 4*a* and the second fixed contact 4*b* are modified, the configuration of the conductive elastic member 7 is modified and the spacer 5 has the conductivity.

FIG. 12 shows the first fixed contact 4*a* and the second fixed contact 4*b* used in the push switch 1 of the present embodiment. In the present embodiment, the first fixed contact 4*a* is a circular central contact disposed on the base portion 31 of the circuit substrate 3 and the second fixed contact 4*b* is a ring-shaped outer contact disposed on the base portion 31 of the circuit substrate 3 with being spaced apart from the first fixed contact 4*a* so as to surround the first fixed contact 4*a*.

FIG. 13 shows a vertical sectional view of the push switch 1 of the present embodiment when the push switch 1 is in the natural state. As shown in FIG. 13, the first fixed contact (central contact) 4*a* is disposed within the opening 52 of the spacer 5 so as to be exposed toward the upper side and face the conductive elastic member 7. On the other hand, the second fixed contact (outer contact) 4*b* is located below the base portion 51 of the spacer 5 and contacts with the lower surface of the base portion 51 of the spacer 5. Thus, the conductive elastic member 7 faces the first fixed contact (central contact) 4*a* and does not face the second fixed contact (outer contact) 4*b* in the present embodiment.

In the present embodiment, the conductive layer 72 of the conductive elastic member 7 is provided so as to cover the entire surface of the disk-shaped elastic portion 71 as shown in FIG. 13. Thus, all of the surfaces of the conductive elastic member 7 containing the surface facing the first fixed contact (the central contact) 4*a* have the conductivity. In the present embodiment, in addition to the disk-shaped conductive elastic member 7 as shown in FIG. 13, for example, the linear conductive elastic member 7 described in detail with reference to FIG. 8 or the film-shaped conductive elastic member 7 described in detail with reference to FIG. 9 can be used as the conductive elastic member 7.

Further, although the constituent material of the dome-shaped spring 6 may be the conductive material or the insulating material in the above-described first embodiment, the dome-shaped spring 6 of the present embodiment should be formed from the conductive material. The conductive elastic member 7 is fixed on the surface of the central movable portion 61 of the dome-shaped spring 6 facing the circuit substrate 3 with a conductive adhesive agent and thus the conductive layer 72 of the conductive elastic member 7 is electrically connected to the dome-shaped spring 6 through the conductive adhesive agent.

Further, the spacer 5 of the present embodiment is formed from the conductive material. As shown in FIG. 13, since the marginal portion 62 of the dome-shaped spring 6 contacts with the spacer 5, the dome-shaped spring 6 is electrically connected to the spacer 5. Furthermore, since the second fixed contact (outer contact) 4*b* contacts with the lower surface of the base portion 51 of the spacer 5 as described above, the second fixed contact (outer contact) 4*b* is electrically connected to the spacer 5. Thus, the second fixed contact (outer contact) 4*b*, the spacer 5, the dome-shaped spring 6 and the conductive layer 72 of the conductive elastic members 7 are electrically connected to each other.

Next, the operation of the push switch 1 of the present embodiment will be described in detail with reference to FIGS. 13 and 14. As shown in FIG. 13, the dome-shaped spring 6 is convex upward in the natural state of the push switch 1 of the present embodiment. Namely, the dome-shaped spring 6 is in the first position in the natural state. In the first position, the marginal portion 62 of the dome-shaped spring 6 is electrically connected to the second fixed contact (outer contact) 4*b* through the spacer 5 and the conductive layer 72 of the conductive elastic member 7 does not contact with the first fixed contact (central contact) 4*a* in the natural state. Namely, when the dome-shaped spring 6 is in the first position, the first fixed contact (central contact) 4*a* and the second fixed contact (outer contact) 4*b* are in the non-conductive state. Thus, the push switch 1 takes the OFF state in the natural state shown in FIG. 13.

In the natural state shown in FIG. 13, when the pressing force exceeding the actuating force of the push switch 1 is applied to the push switch 1, the central movable portion 61 of the dome-shaped spring 6 is elastically deformed toward the lower side and the dome-shaped spring 6 is displaced to the second position. At this time, the push switch 1 is shifted to the pressed state shown in FIG. 14. In the pressed state shown in FIG. 14, the dome-shaped spring 6 is in the second position. In the second position, the marginal portion 62 of the dome-shaped spring 6 is electrically connected to the second fixed contact (outer contact) 4*b* through the spacer 5 and the conductive layer 72 of the conductive elastic member 7 contacts with the first fixed contact (central contact) 4*a*. Thus, when the dome-shaped spring 6 is in the second position, the conductive layer 72 of the conductive elastic member 7, the dome-shaped spring 6 and the spacer 5 serve as the conduction path between the first fixed contact (central contact) 4*a* and the second fixed contact (outer contact) 4*b*. As a result, the first fixed contact (central contact) 4*a* and the second fixed contact (outer contact) 4*b* are in the conductive state. Thus, the push switch 1 takes the ON state in the state shown in FIG. 14.

When the pressing force from the user is released in the pressed state shown in FIG. 14, the push switch 1 is restored to the natural state shown in FIG. 13 by the restoring force of the push switch 1 provided by the elastic restoring force of the dome-shaped spring 6 and the cover film 8.

According to the present embodiment, it is also possible to provide the same effects as those of the first embodiment. Although the description is given to the aspect in which the first fixed contact 4*a* and the second fixed contact 4*b* are respectively the center contact and the outer contact in the present embodiment, the present invention is not limited thereto. Any known pattern of fixed contacts used in the field of the push switch can be used for the first fixed contact 4*a* and the second fixed contact 4*b* and any aspect in which shapes and arrangements of the respective components of the push switch 1 are appropriately modified according to the pattern of the first fixed contact 4*a* and the second fixed contact 4*b* are also involved within the scope of the present invention.

Further, although the number of fixed contacts is two in the first embodiment and the second embodiment described above, the present invention is not limited thereto. The push switch 1 of the present invention may contain at least two fixed contacts as long as the at least two fixed contacts can allow the push switch 1 of the present invention to be in one of the conductive state and the non-conductive state in response to the pressing force applied from the user and the conductive state and the non-conductive state respectively correspond to the ON state and the OFF state of the push switch 1. Thus, the push switch 1 of the present invention may contain three of more fixed contacts used for the same purpose.

Although the push switch of the present invention has been described above with reference to the illustrated embodiments, the present invention is not limited thereto. Each configuration of the present invention can be replaced by any configuration capable of performing the same function or any configuration can be added to each configuration of the present invention.

A person having ordinary skill in the art and field will be able to perform modifications to the described configuration of the push switch of the present invention without significantly departing from the principle, concept and scope of the present invention and the push switch having the modified configuration is also involved within the scope of the present invention. For example, an aspect obtained by arbitrarily combining the first embodiment and the second embodiment is also involved within the scope of the present invention.

In addition, the number and the types of the components of the push switch shown in FIGS. 3 to 10 and FIGS. 12 to 14 are merely illustrative examples and the present invention is not necessarily limited thereto. An aspect in which any component is added or combined or any component is deleted without departing from the principle and the intent of the present invention is also involved within the scope of the present invention. Each component of the push switch may be realized by hardware, software or a combination thereof.

The invention claimed is:

1. A push switch comprising:

a circuit substrate;

two fixed contacts disposed on the circuit substrate;

a non-conductive spacer disposed on the circuit substrate;

a dome-shaped spring which is disposed on the non-conductive spacer so as to be located above the two fixed contacts and can be displaced between a first position in which the two fixed contacts are in a non-conductive state and a second position in which the two fixed contacts are in a conductive state; and a conductive elastic member disposed on a surface of the dome-shaped spring facing the circuit substrate, wherein the dome-shaped spring has a central movable portion and a marginal portion formed so as to surround an edge of the central movable portion and extend from the edge of the central movable portion toward a lower and outer side, wherein the conductive elastic member is formed into a layer structure containing an elastic portion adhering on a surface of the central movable portion of the dome-shaped spring facing the circuit board and a conductive layer disposed on a surface of the elastic portion facing the circuit board, wherein when the dome-shaped spring is displaced to the second position, the two fixed contacts are in the conductive state through the conductive layer, and wherein a lower end of the marginal portion of the dome-shaped spring is placed on the non-conductive spacer, and wherein a gap is between a center portion of the marginal portion and the non-conductive spacer.

2. The push switch according to claim 1, wherein the conductive elastic member is fixed on the surface of the central movable portion of the dome-shaped spring facing the circuit board by an adhesive agent.

3. The push switch according to claim 1, wherein the non-conductive spacer includes a base portion located on the circuit substrate and an opening for exposing the two fixed contacts toward the conductive elastic member.

4. The push switch according to claim 3, wherein the non-conductive spacer further includes a cutout portion for releasing air under the dome-shaped spring when the dome-shaped spring is displaced from the first position to the second position.

5. The push switch according to claim 1, further comprising a cover film covering the dome-shaped spring from an upper side.

6. The push switch according to claim 3, wherein an edge of the base portion of the non-conductive spacer defining the opening of the non-conductive spacer is located below the central movable portion of the dome-shaped spring.

7. A push switch comprising:

a circuit substrate;

a central contact disposed on the circuit substrate;

an outer contact disposed on the circuit substrate so as to be spaced apart from the central contact;

a non-conductive spacer disposed on the circuit substrate;

a dome-shaped spring which is disposed on the non-conductive spacer so as to be located above the central contact and the outer contact and can be displaced between a first position in which the central contact and the outer contact are in a non-conductive state and a second position in which the central contact and the outer contact are in a conductive state; and a conductive elastic member disposed on a surface of the dome-shaped spring facing the circuit substrate, wherein the dome-shaped spring has a central movable portion and a marginal portion formed so as to surround an edge of the central movable portion and extend from the edge of the central movable portion toward a lower and outer side, wherein the conductive elastic member is formed into a layer structure containing an elastic portion adhering on a surface of the central movable portion of the dome-shaped spring facing the circuit board and a conductive layer disposed on a surface of the elastic portion facing the circuit board, wherein when the dome-shaped spring is displaced to the second position, the central contact and the outer contact are in the conductive state through the dome-shaped spring and the conductive elastic member, and wherein a lower end of the marginal portion of the dome-shaped spring is placed on the non-conductive spacer, and wherein a gap is between a center portion of the marginal portion and the non-conductive spacers.

8. A push switch comprising:

a circuit substrate;

a central contact disposed on the circuit substrate;

an outer contact disposed on the circuit substrate so as to be spaced apart from the central contact;

a dome-shaped spring which is disposed above the central contact and the outer contact and can be displaced between a first position in which the central contact and the outer contact are in a non-conductive state and a second position in which the central contact and the outer contact are in a conductive state; and a conductive elastic member disposed on a surface of the dome-shaped spring facing the circuit substrate, wherein the conductive elastic member is formed into a layer structure containing an elastic portion adhering on a surface of a central movable portion of the dome-shaped spring facing the circuit board and a conductive layer disposed on a surface of the elastic portion facing the circuit board, wherein when the dome-shaped spring is displaced to the second position, the central contact and the outer contact are in the conductive state through the dome-shaped spring and the conductive elastic member, and wherein the dome-shaped spring has:

a marginal portion which electrically contacts with the outer contact when the dome-shaped spring is in both of the first position and the second position, and the central movable portion which does not electrically contact with the central contact when the dome-shaped spring is in the first position and electrically contacts with the central contact through the conductive layer of the conductive elastic member when the dome-shaped spring is in the second position.

* * * * *